US006983020B2

(12) United States Patent
 Christiansen

(10) Patent No.: US 6,983,020 B2
(45) Date of Patent: Jan. 3, 2006

(54) METHOD AND APPARATUS FOR FAST BLOCK MOTION DETECTION

(75) Inventor: Bernd O. Christiansen, Goleta, CA (US)

(73) Assignee: Citrix Online LLC, Santa Barbara, CA (US)

( * ) Notice: Subject to any disclaimer, the term of this patent is extended or adjusted under 35 U.S.C. 154(b) by 465 days.

(21) Appl. No.: 10/107,981

(22) Filed: Mar. 25, 2002

(65) Prior Publication Data

US 2003/0179951 A1  Sep. 25, 2003

(51) Int. Cl.
  *H04N 7/12*  (2006.01)
(52) U.S. Cl. ................................. 375/240.16
(58) Field of Classification Search ..............
  375/240.12–240.17; 348/699–700, 416.1;
  386/109, 111; 382/236, 243; 345/473
  See application file for complete search history.

(56) References Cited

U.S. PATENT DOCUMENTS

| | | | |
|---|---|---|---|
| 5,083,860 A |  | 1/1992 | Miyatake et al. |
| 5,103,305 A |  | 4/1992 | Watanabe |
| 5,241,625 A |  | 8/1993 | Epard et al. |
| 5,572,258 A | * | 11/1996 | Yokoyama ............ 348/415.1 |
| 5,577,188 A |  | 11/1996 | Zhu |
| 5,623,603 A |  | 4/1997 | Jiang et al. |
| 5,751,362 A |  | 5/1998 | Lee |
| 5,796,566 A |  | 8/1998 | Sharma et al. |
| 6,167,432 A |  | 12/2000 | Jiang |
| 6,278,466 B1 |  | 8/2001 | Chen |
| 6,289,461 B1 |  | 9/2001 | Dixon |
| 6,307,550 B1 |  | 10/2001 | Chen et al. |
| 6,331,855 B1 |  | 12/2001 | Schauser |
| 6,338,088 B1 |  | 1/2002 | Waters et al. |
| 6,567,813 B1 |  | 5/2003 | Zhu et al. |
| 6,597,736 B1 | * | 7/2003 | Fadel .................. 375/240.01 |
| 6,601,087 B1 |  | 7/2003 | Zhu et al. |
| 6,654,032 B1 |  | 11/2003 | Zhu et al. |
| 6,691,154 B1 |  | 2/2004 | Zhu et al. |
| 6,763,501 B1 |  | 7/2004 | Zhu et al. |
| 6,810,488 B2 |  | 10/2004 | Teng |
| 2002/0035451 A1 |  | 3/2002 | Rothermal |
| 2001/0056547 A1 |  | 5/2002 | Dixon |
| 2002/0052932 A1 |  | 5/2002 | Curtis et al. |
| 2002/0165922 A1 |  | 11/2002 | Wei |
| 2002/0174181 A1 |  | 11/2002 | Wei |
| 2002/0194272 A1 |  | 12/2002 | Zhu |

(Continued)

OTHER PUBLICATIONS

Christiansen, B.O., Schauser, K.E., Munke, M.; "Streaming Thin Client Compression," In Proceedings of the IEEE Data Compression Conference, Snowbird, UT, Mar. 27-29, 2001, pp. 1-10.

(Continued)

*Primary Examiner*—Vu Le
(74) *Attorney, Agent, or Firm*—Choate, Hall & Stewart, LLP

(57) ABSTRACT

A method, system, and/or apparatus for quickly detecting blocks or regions in an image whose pixels that can be coded efficiently by a pointer to the same block occurring in a reference image. The reference image is shared between an encoder and a corresponding decoder. One embodiment of the encoder quickly detects such blocks in an image by: (a) defining features such that substantially fewer features occur in an image than pixels, (b) correlating features in an image to a corresponding feature in the reference image, (c) estimating a displacement vector representative of the displacement of the correlated features, (d) estimating a seed point within the displaced block from which to grow the block, and (e) growing the displaced block to determine its size, shape, and/or dimensions.

41 Claims, 10 Drawing Sheets

U.S. PATENT DOCUMENTS

| | | |
|---|---|---|
| 2003/0018662 A1 | 1/2003 | Li |
| 2003/0061355 A1 | 3/2003 | Yang et al. |
| 2003/0084169 A1 | 5/2003 | Zhu et al. |
| 2003/0085922 A1 | 5/2003 | Wei |
| 2003/0164853 A1 | 9/2003 | Zhu et al. |
| 2003/0167293 A1 | 9/2003 | Zhu et al. |
| 2003/0167301 A1 | 9/2003 | Zhu et al. |
| 2003/0167302 A1 | 9/2003 | Zhu et al. |
| 2003/0167303 A1 | 9/2003 | Zhu et al. |
| 2003/0167304 A1 | 9/2003 | Zhu et al. |
| 2003/0167305 A1 | 9/2003 | Zhu et al. |
| 2003/0167339 A1 | 9/2003 | Zhu et al. |
| 2003/0167418 A1 | 9/2003 | Zhu et al. |
| 2003/0182375 A1 | 9/2003 | Zhu et al. |
| 2003/0220973 A1 | 11/2003 | Zhu et al. |
| 2004/0205213 A1 * | 10/2004 | Paz et al. .................. 709/231 |

OTHER PUBLICATIONS

Christiansen, B.O., Schauser, K.E., Munke, M.; "A Novel Codec for Thin Client Computing," In Proceedings of the IEEE Data Compression Conference, Snowbird, UT, Mar. 28-30, 2000, pp. 1-10.

* cited by examiner

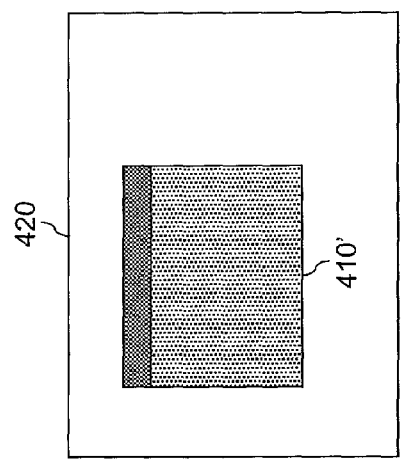
FIG. 4B
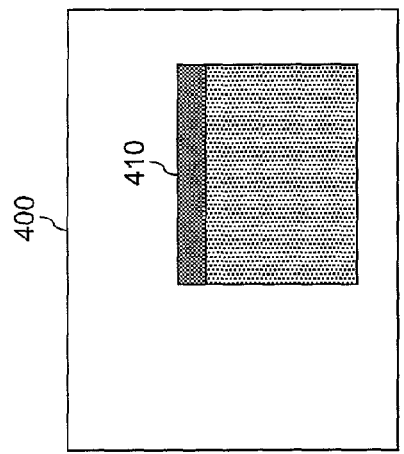
FIG. 4A
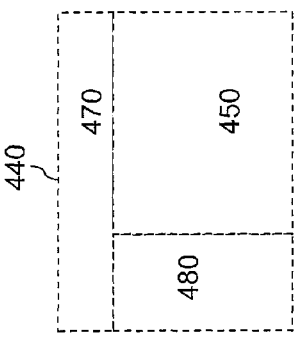
FIG. 4D
FIG. 4C

METHOD AND APPARATUS FOR FAST BLOCK MOTION DETECTION

FIELD

One aspect of the invention generally relates to encoding contents of a display screen in real-time. More particularly, one embodiment of the invention provides an apparatus and/or method for detecting a block in an image that occurs verbatim in a reference image, the reference image is shared between an encoder and a decoder and, thus, the block can be coded efficiently by a pointer to its previous occurrence.

BACKGROUND

Many applications, such as remote access software and screen recording software, often encode the contents of a computer screen in real-time. These applications typically represent the contents of a screen as compactly as possible because of bandwidth or storage constraints.

Software for encoding the contents of a computer screen (the encoder) is naturally complemented by software for decoding and displaying the encoded contents (the decoder) at a different location or later time. The encoder typically acquires the contents of a computer screen in one of two ways. Either, 1) output events, such as graphics function calls, at the library or device driver level are intercepted, or 2) the effects of output events, such as rendered lines or circles, are read back from the screen as images. In the first case, screen contents are typically encoded as a sequence of output events, and in the second case, multiple output events are often encoded by a single image and the screen contents are represented as a sequence of images.

For example, U.S. Pat. No. 5,241,625 discloses a system for remotely controlling information displayed on a computer screen by intercepting output events such as graphics calls. Graphics commands which drive a computer window system are captured and saved as a stored record or sent to other computers. A message translation program translates the captured messages for playback on a designated computer.

U.S. Pat. No. 5,796,566 discloses a system in which sequences of video screens forwarded from a host CPU to a video controller, are stored and subsequently retrieved by a terminal located remote from the host CPU. In particular, display data is captured in a local frame buffer which stores the display data frame by frame. A previous frame or screen of display data is compared with a current frame or screen of display data to determine if a change has occurred. The change is then stored.

U.S. Pat. No. 6,331,855 discloses a system that compares, at a predetermined interval, a portion of the image that is currently displayed in a frame buffer to a corresponding portion of a previously displayed image that is stored in system memory to determine if the previously displayed image has changed. If so, the exact extent of the change is determined and it is stored and/or forwarded to a remote computer.

Intercepting output events and representing the contents of a screen in terms of these events often leads to reasonably sized representations. This is because such events are typically high-level and thus provide compact descriptions of changes to a screen. However, implementing this method is often not feasible because it is not easily ported to other platforms, requires administrative privileges (e.g., display driver access is often restricted), requires a reboot (e.g., to install a new device driver), and/or lowers the stability of the overall system (e.g., most remote control packages interfere with one another). On the other hand, representing screen contents by a sequence of images typically leads to very large representations. Large representations usually hinder the overall system performance (i.e., cause perceivable delays).

The size of a sequence of images can be substantially reduced by sophisticated data compression. A particularly space-efficient form of data compression is representing whole blocks of pixels by pointers to earlier occurrences of the same block on the screen as it has been encoded. For example, moving a window or scrolling its contents typically produces a sequence of images where each image contains a large block that occurs verbatim on the previous screen.

While encoding blocks that occur verbatim in previous screens by a pointer is highly space-efficient, doing so in a timely manner is computationally demanding because, in the general case, it requires an exhaustive search.

A related problem is motion-compensated video signal coding where motion estimation is used to predict the current frame and to encode the difference between the current frame and its prediction. Typically, motion vectors are only determined and coded for a subset of pixels such as, for example, a sparse grid of pixels. Motion vectors for the remaining pixels are estimated from the first set of motion vectors by, for example, dividing the frame into blocks and assigning the same motion vector to all pixels in each block. For a video signal, a motion field can be interpolated without adverse effects because pixel levels within a local window are typically smooth.

For example, U.S. Pat. No. 5,751,362 discloses an apparatus that 1) identifies regions of motion by comparing blocks in a previous frame and a current frame 2) selects a first set of pixels, i.e., features, from the previous frame using a grid and/or edge detection, 3) determines a first set of motion vectors using, for example, a block matching algorithm (BMA), and 4) estimates motion vectors for all remaining pixels by computing affine transformations for non-overlapping polygons (e.g., triangles). The polygons are obtained by connecting feature points, which have been translated into the current frame, in a predetermined way.

In U.S. Pat. No. 5,751,362 the following BMA is employed. Given a block in the current frame, the BMA finds the best matching block in the previous frame according to a criteria such as, for example, the minimum mean square error. While an exhaustive search is by far too slow for on-the-fly encoding, limiting the maximum displacement and iteratively evaluating only a subset of all candidate blocks and, in each step, proceeding in the direction of a local optimum substantially reduces the computational burden. These optimizations are based on two assumptions: blocks typically move by only a few pixels, and the distortion between the previous and the current frame is smooth across the search window. While this is typically the case for video signals, screen contents (e.g. graphic computer interfaces, display windows, etc.) are inherently different.

Accordingly, there is a need for a method and apparatus that quickly detects variable-size blocks in an image that also occur verbatim in a reference image by exploiting the distinct characteristics of typical screen contents.

SUMMARY OF THE INVENTION

One aspect of the present innovation provides a method, system, and/or apparatus for quickly detecting blocks in an image whose pixels that can be coded efficiently by a pointer to the same block occurring verbatim (or probabilistically or approximately) in one of a limited number of reference images. No restrictions are imposed on the reference images other than that they must be shared between the encoder and corresponding decoder. The encoder quickly detects such blocks in an image by: (a) defining features such that substantially fewer features occur in an image than pixels, features are representative of the characteristics of an image and features in two images are never misaligned, (b) mapping each feature in an image to a feature in one of the reference images such that it is likely that the corresponding pixels surrounding such a pair of features match, and (c) iteratively estimating a pixel location that is contained in the largest block and its corresponding pixel location in one of the reference images based on these mappings before determining its size at the pixel level.

In particular, (a) the encoder correlates (i.e., maps or matches) instances of features that occur relatively infrequently in one of the reference images with instances of the same feature in the source image, (b) calculates relative offsets for these mappings, (c) clusters these offsets, and (d) iteratively grows a block, that occurs in both the image and one of the reference images, anchored substantially at the center of the features supporting the predominant cluster.

BRIEF DESCRIPTION OF THE DRAWINGS

FIGS. 4A, 4B, 4C, and 4D illustrate how, according to one aspect of the invention, block motion is found in an exemplary image to fully describe the difference between a previous frame and a current frame relative to the previous frame.

DETAILED DESCRIPTION

In the following detailed description of the invention, numerous specific details are set forth in order to provide a thorough understanding of the invention. However, it should be recognized that the invention may be practiced without these specific details. In other instances well known methods, procedures, and/or components have not been described in detail so as not to unnecessarily obscure aspects of the invention.

Throughout this description, the term 'block' refers to any arbitrarily shaped display region or region of pixels. The term 'frame' refers to a buffer, or other representation of a screen content, image, and/or display. A 'feature' refers to any characteristic of an image that occurs substantially fewer times in an image than the number of pixels in the image. The terms 'match' or 'matching' and 'correlate' or 'correlating', as in block matching or feature correlating, include verbatim, literal, probabilistic, statistical, approximate, and/or empirical matching and/or correlating. It is clearly understood that whenever one of these terms is employed (i.e. verbatim) any of the other listed terms may be employed in an embodiment of the invention.

One aspect of the present invention provides a system, apparatus and/or method for encoding whole blocks of pixels in an image quickly and efficiently by referencing other images that are shared between encoder and decoder. It is particularly well suited for encoding the contents of a computer screen because it takes advantage of the temporal self-similarity of typical screen contents, is fast enough to encode the contents of a screen on-the-fly (or with insubstantial or unperceivable delay), and does not substantially increase CPU utilization or affect other applications. Furthermore, it operates on images and thus does not require intrusive system-level modifications and can be implemented across various platforms (i.e., various processing systems, architectures, and/or operating environments).

Figure 1:
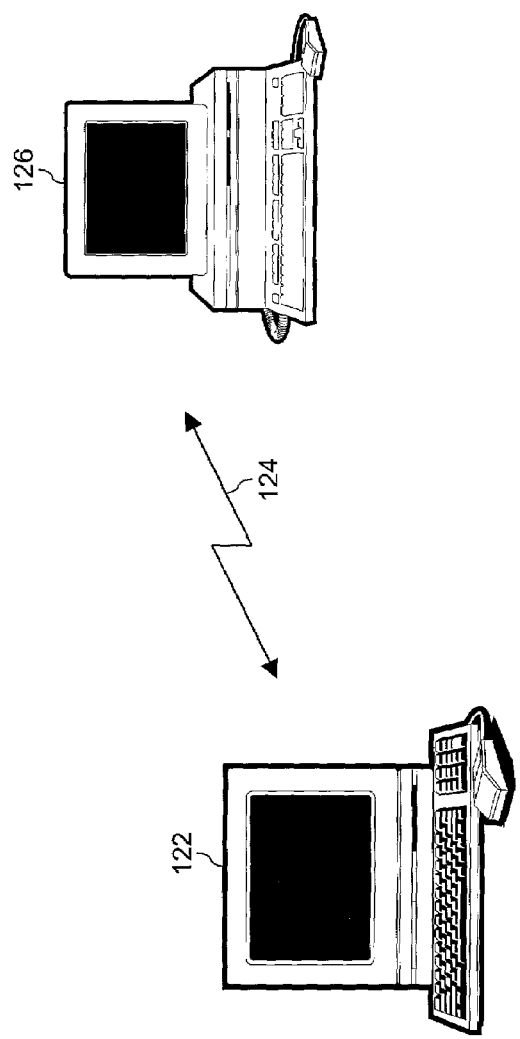
FIG. 1 illustrates an exemplary remote access system in which one embodiment of the apparatus and method of the present invention are utilized.

FIG. 1 shows an exemplary application of the present invention. As shown, the contents on the screen of a source system 122 are transmitted across a communication or storage medium 124 to a remote system 126 where they are displayed on another screen.

Figure 2:
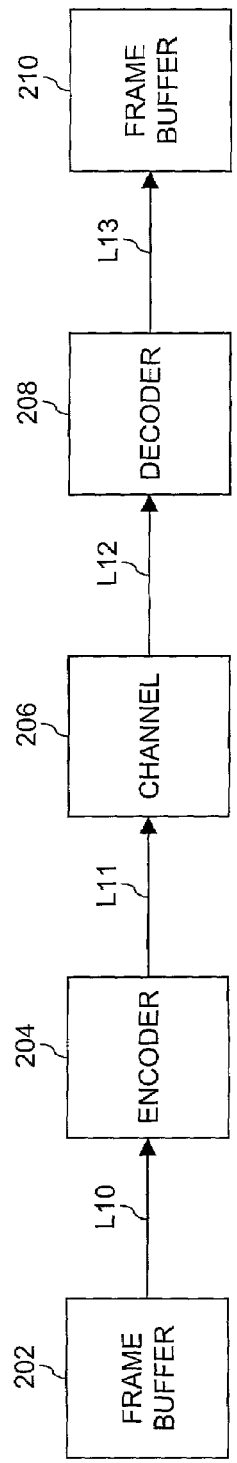
FIG. 2 is a block diagram illustrating the operation of the invention in the remote access system illustrated in FIG. 1.

Referring to FIG. 2, the source system has a frame buffer 202, which stores the contents of the source system's screen in the form of pixels. As shown, the contents of the frame buffer 202 are fed to an encoder 204, for example, periodically or upon a change being detected or some other triggering event. The encoder 204 transforms the current frame L10 and forwards its encoded or transfer representation L11 to the decoder 208 via the channel 206. The channel 206 may be any communication or storage medium, such as, a network, telephone line, magnetic storage, wireless transmission medium, etc. The decoder 208 applies an inverse transformation to its input signal L12 and outputs the reconstructed frame L13 to a frame buffer 210.

Figure 3:
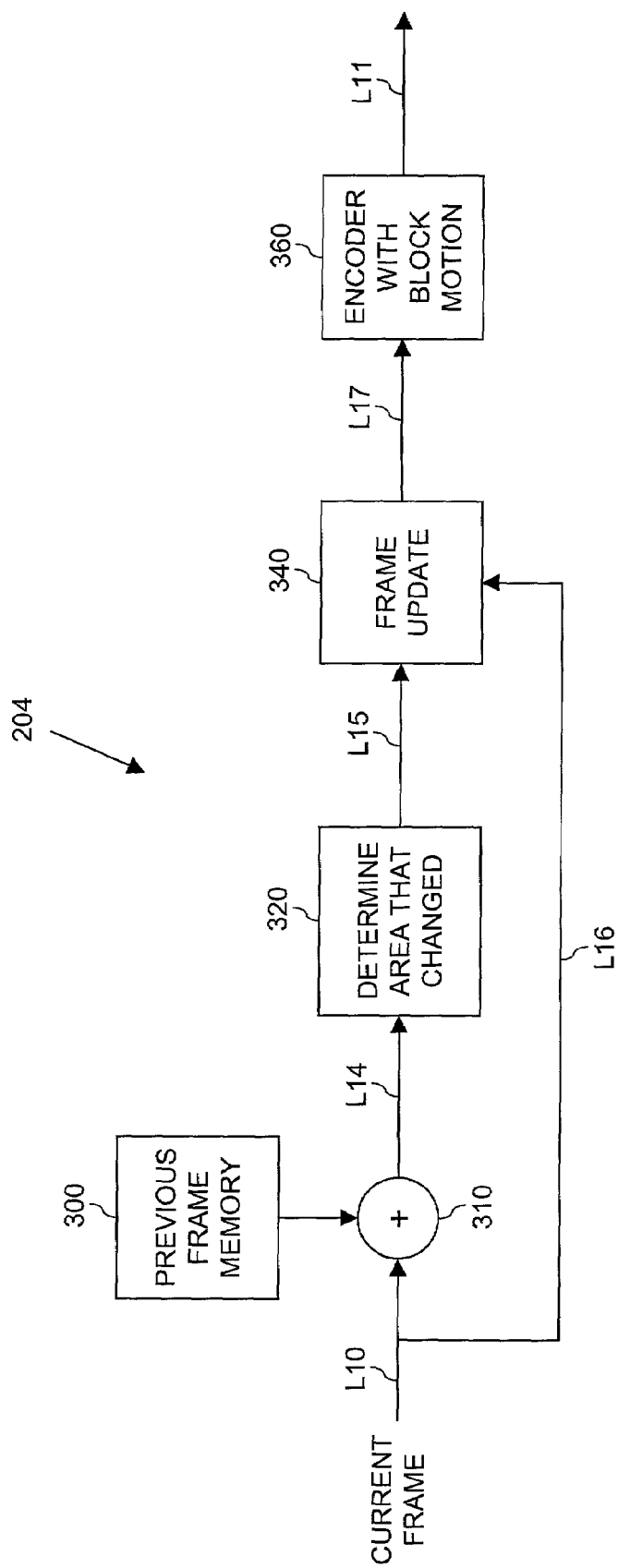
FIG. 3 is a block diagram illustrating an exemplary apparatus for encoding the difference between two frames according to one embodiment of the invention.

According to one implementation of the invention the encoder 204 determines the area of the current frame that has changed with reference to the previous frame and only codes the pixels in the changed area for transmission. FIG. 3 illustrates a block diagram of the encoder 204 according to one embodiment of the present invention. The pixels of the previous frame (i.e., containing the previous image) are stored in memory 300. A comparator 310 determines which pixels have changed 320 in the current frame on L10 (i.e., containing the new/current image). The pixels that occur in the area that has changed are stored in memory 340. If it is determined that an area or region in the current frame L10 has changed from the previous frame 300, then the changed region L17 is fed into an encoder 360 for variable-size images. In one implementation, the contours, size, and/or location of a changed area or region are identified 320 and the changed image region/block is extracted from the current frame L16 and copied into frame update memory 340.

The aspect of the invention illustrated in FIG. 3 helps to identify a region or area that has changed between the current frame (current image) L10 and the previous frame (previous image) 300 and thus reduce the search region between the current and previous frames (images). However, other aspects of the invention (i.e., encoder with block motion 360) may be practiced without reducing the search region or by reducing the search region in a different manner.

FIGS. 4A–D illustrate the operation of the encoder block diagram 204 shown in FIG. 3. FIG. 4A shows an exemplary current frame 400 on L10 with a first image block 410. FIG. 4B shows an exemplary previous frame 420, with the same first image block 410' at a different location, stored in memory 300 (FIG. 3). FIG. 4C shows the resulting region of changed pixels 440, between the current and previous frames 400 and 420, including the first image block 450 (previously referred as 410 and 410'), common to both frames 400 and 420. In one embodiment, region 440, including block 450, is stored in the frame update memory 340 (FIG. 3). FIG. 4D further illustrates how the encoder with block motion 360 (FIG. 3) may represent the changed region 440 in three blocks—the first image block 450, found in both the current and previous frames 400 and 420, and two blocks 470 and 480 representing regions not common to both frames 400 and 420.

According to one implementation, the resulting region of changed pixels 440 is stored in 340 (FIG. 3) along with a location vector 445 to reference the location of the changed region 440 within the current frame (image) 400. In yet another embodiment, the current frame 400 is stored in frame update 340 (FIG. 3) along with parameters indicating the region of changed pixels 440. This permits subsequent processing by the encoder with block motion 360 to focus on the region of changed pixels 440. Other equivalent representations for identifying a changed region are also possible and do not deviate from the invention.

In many of the illustrative examples below the term 'changed image region(s)' is employed to describe a region of changed pixels such as 440. However, it must be clearly understood that encoder with block motion 360 may be implemented with or without previous identification of a region of changed pixels.

Figure 5:
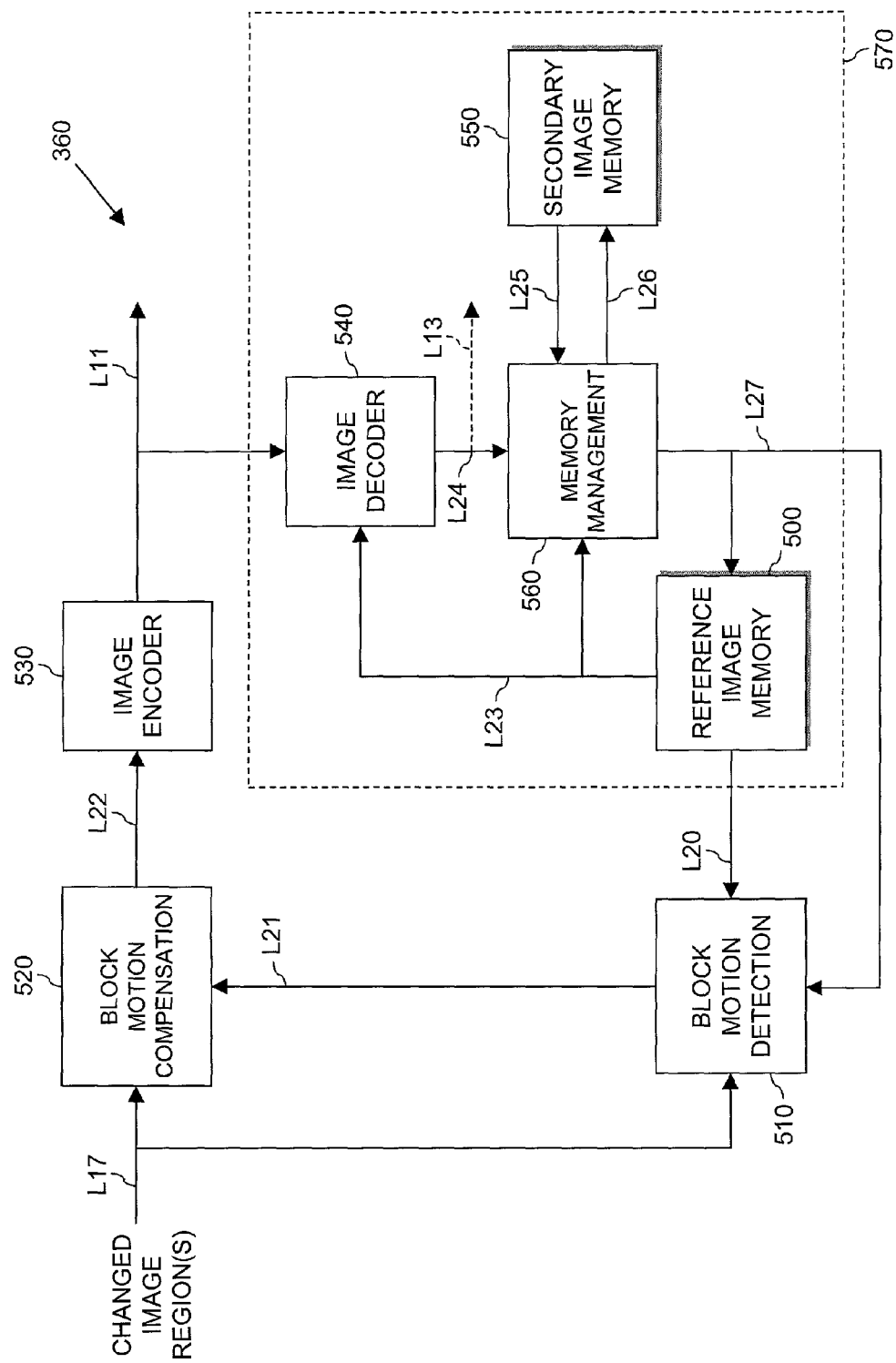
FIG. 5 is a block diagram illustrating image encoding with block motion detection in accordance with an exemplary embodiment of the present invention.

FIG. 5 is a block diagram illustrating one implementation of encoder 360 for compressing variable-size images with fast block motion detection in accordance with an exemplary embodiment of the present invention. As shown, the changed image region (i.e., 440) on L17 is fed into both block motion detection 510 and block motion compensation 520. Block motion detection 510 determines blocks in the changed region or image L17 that occur verbatim in memory 500. For those portions of the changed region L17 that occur verbatim in the reference image memory 500, one or more blocks and one source location for each block, or groups of blocks, is sent to block motion compensation 520 via L21. The memory 500 stores a limited number of images that are shared or are common to both the encoder 204 and decoder 208 (FIG. 2). For example, in one embodiment the memory 500 stores multiple images or a library of images from which one reference image is selected to perform feature matching. The same reference image or a different reference image may be selected from the image library for matching different features.

Block motion compensation 520 transforms the current image on L17 into a representation that describes the source image in terms of blocks that can be copied from memory 500 and blocks of raw pixels. Assuming that the image shown in FIG. 4C is retrieved via L17 and the image shown in FIG. 4B is stored in reference image memory 500, that is, the previous frame, block motion detection 510 determines, for example, that the window 450 also occurs in the reference image memory 500. Given this information, block motion compensation 520, for example, segments the changed region 440 in FIG. 4C on L17 into three blocks 450, 470 and 480 (shown in FIG. 4D) where blocks 470 and 480 are represented by raw pixels and block 450 is represented by a pointer to its occurrence in memory 500.

Encoder 530 codes the transformed image (i.e., a partition of the original image into blocks some of which are represented by a pointer to a matching block in reference image 500) and forwards it via L11 to the encoder-internal decoding apparatus 570 and the decoder 208 in FIG. 2. The latter 208 is structured like, and operates in the same way as, the encoder's 360 internal decoding apparatus 570 where L13 is branched off L24.

The encoder 530 identifies displaced and/or possibly displaced regions by a shape, a location, and a displacement to code changes between a changed image region L17 and a reference image 500. In one embodiment of the present invention, these parameters are encoded with any universal method such as the deflate algorithm described in "DEFLATE Compressed Data Format Specification", Request for Comments (RFC) No. 1951, Internet Engineering Task Force (IETF) (by Peter Deutsch), and pixels are encoded with any method for compressing images such as Portable Network Graphics (PNG) which is described in "PNG (Portable Network Graphics) Specification", RFC No. 2083, IETF (by Tom Boutell, et. al.). In various implementations, the encoder 530 may be either a lossless or a lossy encoder. In an implementation where a lossless encoder 530 is employed, the image decoder 540 may not be necessary since the decoded image L17 may be obtained directly.

The decoder 540 is the counterpart to the encoder 530 and receives coded changes L11 from the encoder 530. In this embodiment of the decoder 540, it decodes copied blocks by retrieving their pixels from memory 500 via L23 and provides the decoded image on L24. The memory management unit 560 may use the decoded image to update memory 500.

In a preferred embodiment of the invention, memory 500 stores only the previously decoded frame as it appears in frame buffer 210 shown in FIG. 2, and the memory management unit 560 updates memory 500 in the same way frame buffer 210 is updated. Thus, the encoder 204 and decoder 208 may maintain duplicate images or frame buffers in memory 500 and frame buffer 210. In other embodiments, the memory management unit 560 updates memory 500 using secondary memory 550 which may, for example, store a large number of images on disk and must also be available, possibly as a copy on another storage medium, at the decoder 208 in FIG. 2. Maintaining multiple images of previous frames permits efficient image compression when a user switches between two or more windows (i.e., applications or graphical user interfaces) for instance.

In one embodiment, all changes to memory 500 are also directly communicated to the block motion detection unit 510 via L27 so that the block motion detection unit 510 can keep its internal data structures up-to-date. Additionally, in one embodiment, the memory management unit 560 may be coupled L23 to the reference image memory 500 to keep track or monitor the image(s) stored therein.

Figure 6:
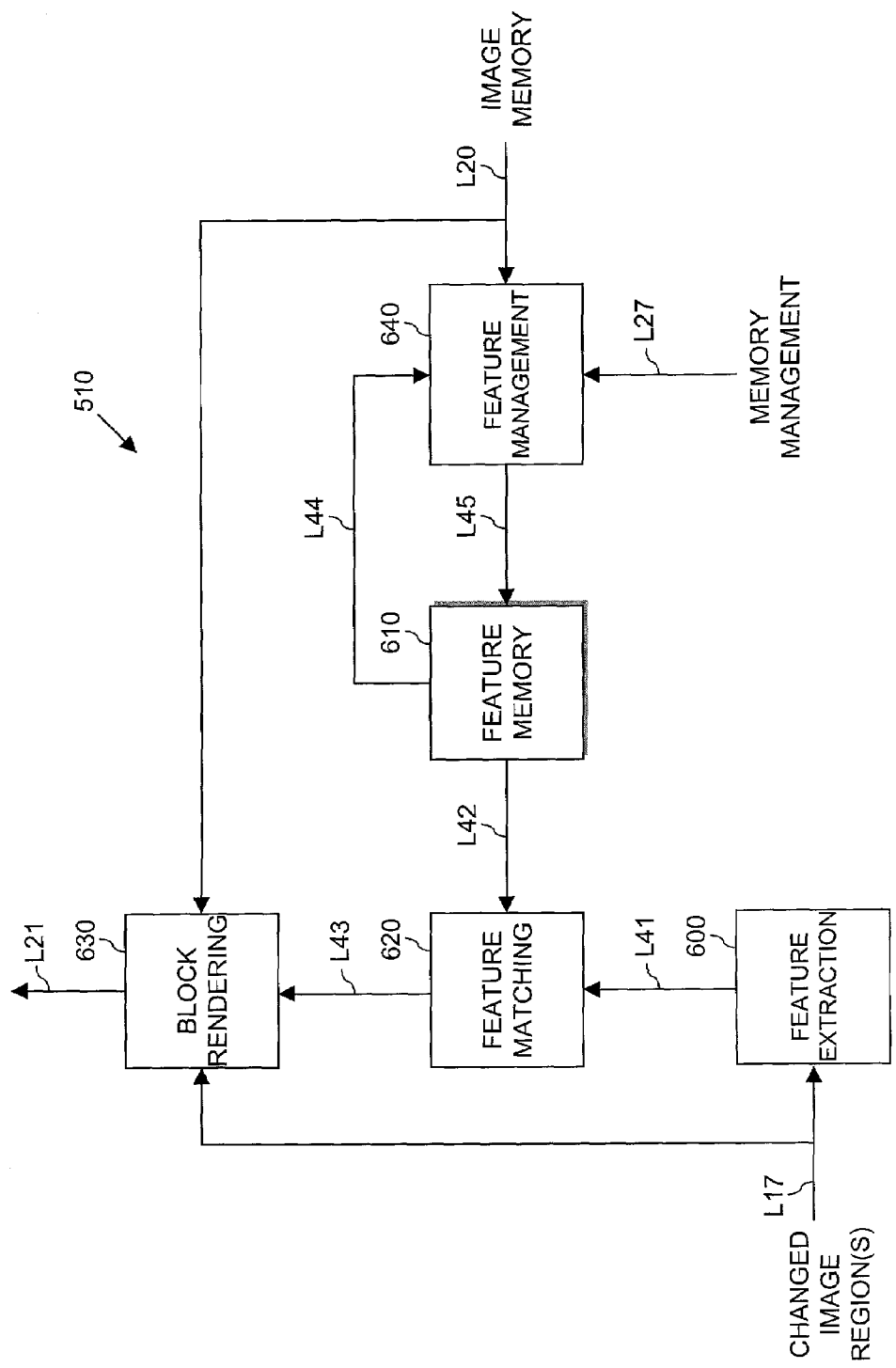
FIG. 6 is a block diagram illustrating how block motion is detected according to one implementation of the present invention.

FIG. 6 is a block diagram illustrating one implementation of the exemplary block motion detection unit 510 in FIG. 5. Generally, block motion detection comprises four steps: 1) feature extraction 600, 2) feature matching 620, 3) block rendering 630, and 4) feature management 640. Reference images in memory 500 are indexed using easily trackable features and the indexed features L45 are stored in a feature memory 610. Similarly, feature extraction 600 is performed on the current image L17 to identify its features L41.

Identifying features in both the reference image L20 and current image L17 permits finding matching feature pairs 620 in the source (in reference image) and destination (in current image) locations at which blocks are likely to match. The matched feature pairs L43 (derived from L41 and L42), along with the reference and current images L20 and L17, form the basis for quickly determining blocks 630 that either occur verbatim, literally, probabilistically, statistically, approximately, empirically, and/or are otherwise likely to occur in an image in memory 500. By keeping the number of features in an image small compared to the number of pixels in the image and maintaining the feature index 610, which is incrementally updated instead of re-computing it for each image, block motion can be detected in real-time or, at least, without noticeable or unacceptable latency.

A feature management unit 640 may serve to receive reference images L20 and recent changes to the reference images L27 (from the memory management unit 560) and incrementally update the feature memory index 610. In one implementation, the feature management unit 640 may be coupled L44 to the feature memory 610 in order access the currently indexed features. The feature management unit 640 may incrementally update the feature memory index 610 as one or more of the reference images are updated. Thus, the management unit 640 may remove or delete some features or instances of features (when they have been removed from the corresponding image) or insert or add new features or instances of features as the reference image(s) 500 changes or new images or regions are added.

Various schemes or frameworks may be employed to define what is considered a feature. Furthermore, the definition of a feature may be predetermined or dynamically selected. According to one embodiment of an aspect of the invention, a feature may be defined as one or more pixels that occur in a template (e.g., string of pixels). For example, a feature may be defined as a value calculated from a two-dimensional layout of pixels. Additionally, in one embodiment, a feature definition may require that the template itself occur in the context of some particular pixel configuration. The template and its context may overlap. In various configurations, the size and/or configuration of the context do not have to be fixed, but may, for example, depend on earlier pixels (e.g., other pixels) in the context itself. Similarly, the size and/or configuration of the template may depend on its context and/or earlier pixels in the template itself. The pixels that occur in the template may be ordered or unordered. In other embodiments, a feature is defined as a hash code of the pixels that occur in the template. Any hash function may be employed for this purpose. Thus, a feature may be defined based on a template of pixels that occurs in the context of a static or dynamic arrangement of absolute pixel values, relative pixel values, or both.

Figure 7A:
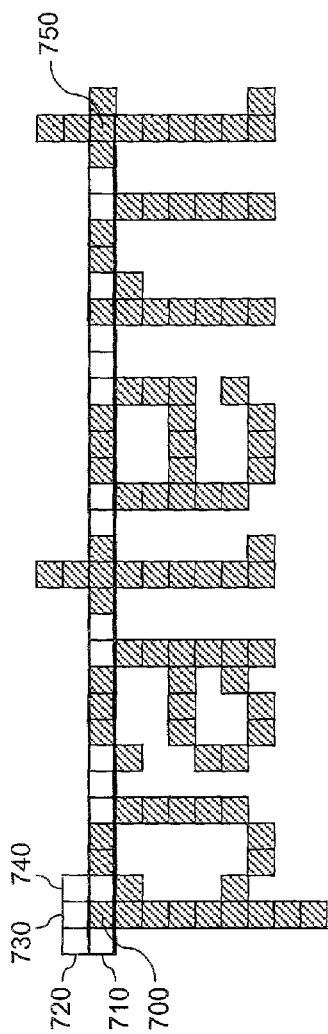
FIG. 7A illustrates how features may be defined according to one embodiment of an aspect of the invention.

FIG. 7A illustrates an example of a definition of a feature that is based on a 32-pixel string. In the implementation shown, the 32-pixel string is required to occur in a context of four pixels of the same color that are arranged like pixels 710, 720, 730 and 740, and where the first pixel 700 must be different from its left neighbor 710. In this example, feature (32-pixel string) begins at pixel 710 and ends at pixel 750. The feature itself may be represented in a number of different ways, including as a hash code of the 32-pixel string beginning at pixel 710 and ending at pixel 750.

In other embodiments of the invention, a different context and/or template, of different size, configuration, and/or properties, may be employed to define a feature. A feature may also be defined in a number of other ways. For example, a feature may be defined as a function of the distances between up to N subsequent pixels occurring in some context, where N is an integer number.

According to one aspect of the invention, it is preferable to employ a context that occurs relatively infrequent when compared to the total number of pixels in an image. This reduces the number of features that are to be correlated while retaining the relative uniqueness of the features. Thus, where features are represented by hashed values for instance, a feature extracted from the changed image region L41 may be quickly matched to a feature L42 in the feature memory 610.

Figure 8:
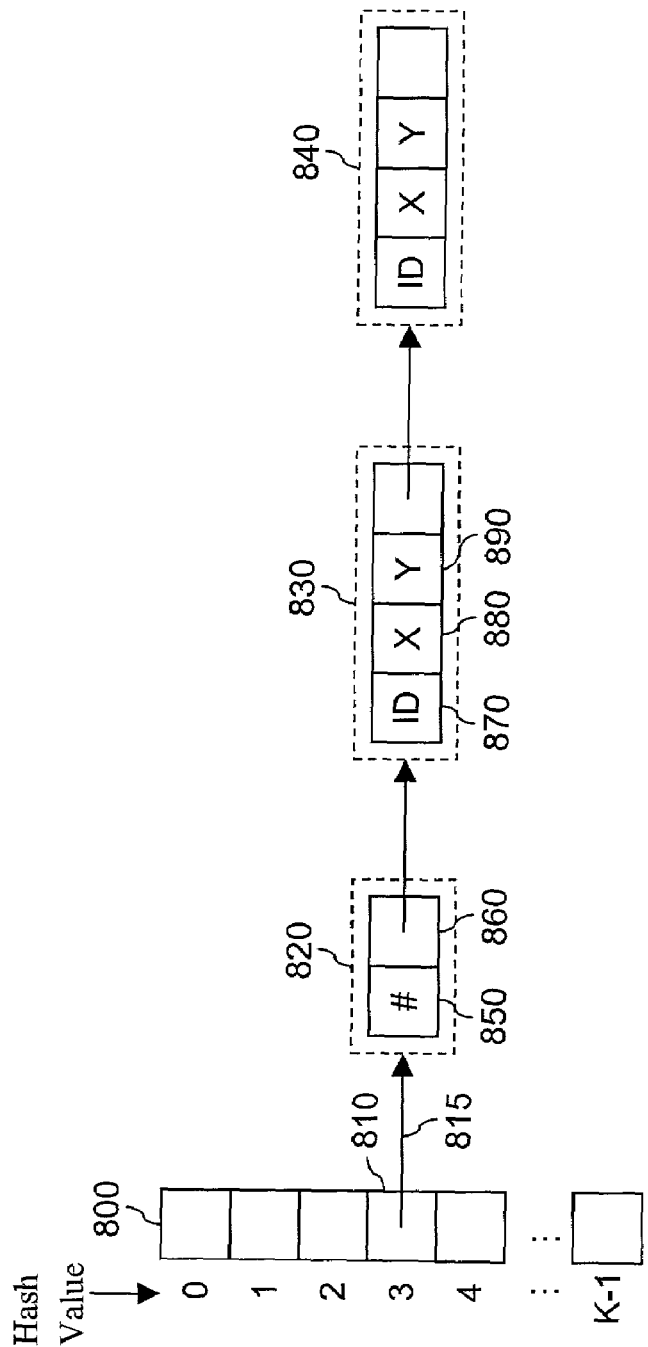
FIG. 8 illustrates one embodiment of a data structure for storing features in memory such that features that occur infrequently can be determined and accessed quickly.

The locations of all or some features that occur in the images in memory 500 (FIG. 5) are cached in feature memory 610. In one embodiment of the invention, feature memory 610 is implemented as a hash table that maps a feature to a list of instances of the same feature in memory 500. In a preferred embodiment of the invention, a feature is hashed from the outset. That is, the definition underlying a feature is converted into an integer value between 0 and K−1, where K is an integer number. In this case, memory 610 may be implemented by an array 800, for example, as shown in FIG. 8. Each array element maps a feature, that is, an integer value, to a list whose head stores the number of instances 850 of the same feature in memory 500 that follow. In FIG. 8, the fourth array element 810 maps features of integer value three (3) to a list with a head 820 and two elements 830 and 840. Each element 830 and 840 references an instance of the feature in memory 500 by an image identifier 870 and a position 880 and 890 within the image. If multiple images are stored in memory 500, either a separate array may be kept for each image or a single array may be used for all images.

Figure 7B:
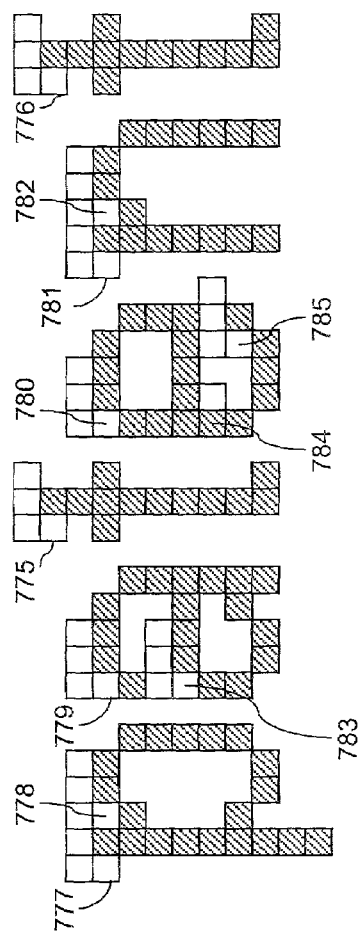
FIG. 7B shows all features that occur in an exemplary image using the feature definition illustrated in FIG. 7A.

Referring again to FIG. 6, the first step of block motion detection is feature extraction 600. That is, the changed image region on L17 is scanned for features. In one embodiment of the invention, the changed image region on L17 is scanned from top to bottom and left to right. Using the 4-pixel context described above, in FIG. 7A, FIG. 7B illustrates the order 775, 776, 777, 778, 779, 780, 781, 782, 783, 784, and 785 in which features are found in an exemplary image.

The second step is feature matching 620. That is, each instance of a feature found in the changed image region L17 and provided on L41 is mapped to an instance of the same feature that is cached in memory 610 and provided on L42. The correlation of features should be such that it is likely that pixels surrounding an instance of a feature in the changed image region L17 match the corresponding pixels surrounding its counterpart in one of the images in memory 500.

In one implementation, such a correlation of features is derived from the number of occurrences of each feature in one or more of the images in memory 500, depending on the organization of feature memory 610.

In one embodiment of the invention, for each instance of a given feature in the changed image region L17, the reference image in memory 500, from among multiple reference images, which has the fewest number of instances of the same feature, but less than some threshold number of instances and greater than zero instances, is selected for feature matching. An arbitrary instance of the chosen reference image is correlated to the instance in the image region L17. For each different instance of a feature in the changed image region L17, it is possible that a different reference image may be selected based on the criteria described above. In one implementation of the invention, correlating a threshold percentage of the instances in the changed image region to instances in the same reference image may rely on the uniqueness of the feature(s) employed. Additionally, in various implementations different image blocks may be copied or grown from different reference images.

Figure 9:
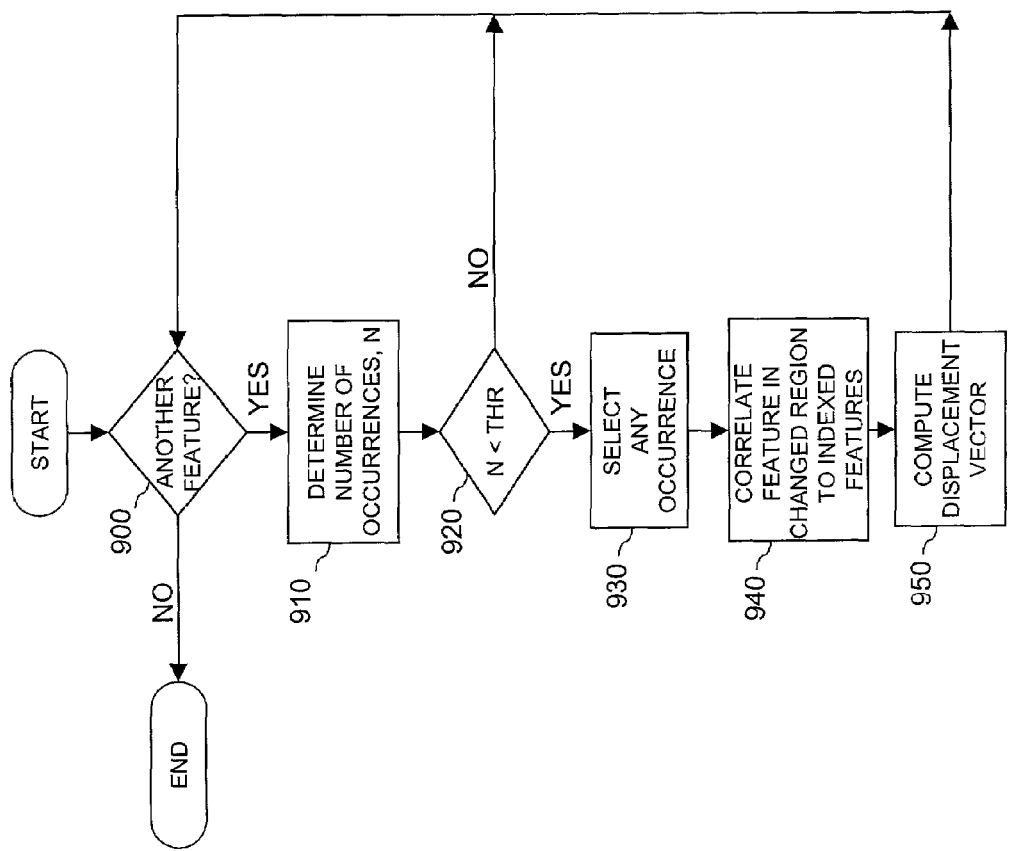
FIG. 9 is a flow diagram illustrating one embodiment of a technique for matching features according to one aspect of the invention.

FIG. 9 is a flow diagram illustrating one embodiment of a technique for matching features according to one aspect of the invention. If an array like the one shown in FIG. 8 is maintained for each image in memory 500, the number of instances of a feature is looked up in each of these arrays. The array that gives the smallest non-zero count of features is used from here on. Reducing the number of features to be matched expedites the feature matching process. As shown in FIG. 8, the number of instances 850 is quickly accessed because it is stored in the head 820 of each list 815. Alternatively, the set of arrays could be ordered, and the first array that gives a count that is less than some threshold could be selected. In other implementations, other schemes may be employed to select an index or array of features from among two or more indexes or arrays without departing from the invention.

Once a feature index or array 800 in feature memory 610 has been selected or a single array is used, each feature L41 in the changed region L17 may be correlated with a feature L42 in the selected feature array 800. Using the feature L41, a list of instances 815 of the same feature in one of the images in memory 500 is looked up 910 in the array 800. The number of instances (N) 850 of the feature is compared to some threshold value (THR) 920, where N is an integer. If the number of instances (N) 850 (i.e., the length of the list) is less than the threshold (THR), then one occurrence of the feature in the list 815 is selected 930 and correlated 940 to the corresponding feature in L41 from the changed region. In one implementation, the first instance 830 of a feature in the list 815 is arbitrarily selected.

In other implementations, the pixels from which an instance of a feature 810 in the changed region has been hashed are compared to the corresponding pixels of one of its instances in memory 500 stored in the list 815. If, and only if, the pixels match, the two instances are correlated. One purpose of the pixel-by-pixel comparison is to check the unlikely event that, even though the features (hash values) match, the pixels from which their integer values have been hashed are not the same. This check is to guarantee a verbatim or exact match between pixels, not hash codes. In yet other implementations, just a subset of the feature pixels are compared to ascertain a statistically, probabilistically, or approximately accurate match between features in the images in the changed region L17 and memory 500.

In yet other implementations, where the features match but their underlying pixels do not, the other instances in the list 815 may be tested in a predetermined order or arbitrarily until a complete match is found or the end of the list is reached. In one embodiment, if no match is found for a feature, that feature in the changed region L17 is ignored.

Note that the likelihood of more than one instance of a feature being found in a feature index or array is relatively small if a relatively unique context is employed and a feature is defined by a sufficiently long pixel string (i.e., 32-pixel string).

Once an instance of a feature has been correlated 940 with an instance of the same feature in one of the images in memory 500 that is stored in memory (feature index) 610, a displacement vector is computed from their locations 950 as shown in FIG. 9. The displacement vector represents the latter (current) instance relative to the former (previous) instance (e.g., as an (image identifier, delta x, delta y) triple).

Once all instances of features found in the changed image region L17 have been processed, the resulting pairs of matched features are provided on L43 and used to determine blocks that occur in both the changed region L17 and one of the images in memory 500. In one implementation, each feature pair in L43 is represented by the location of the feature in the reference image 500 and a vector indicating the displacement of the matching feature in the changed image region L17.

Figure 10A:
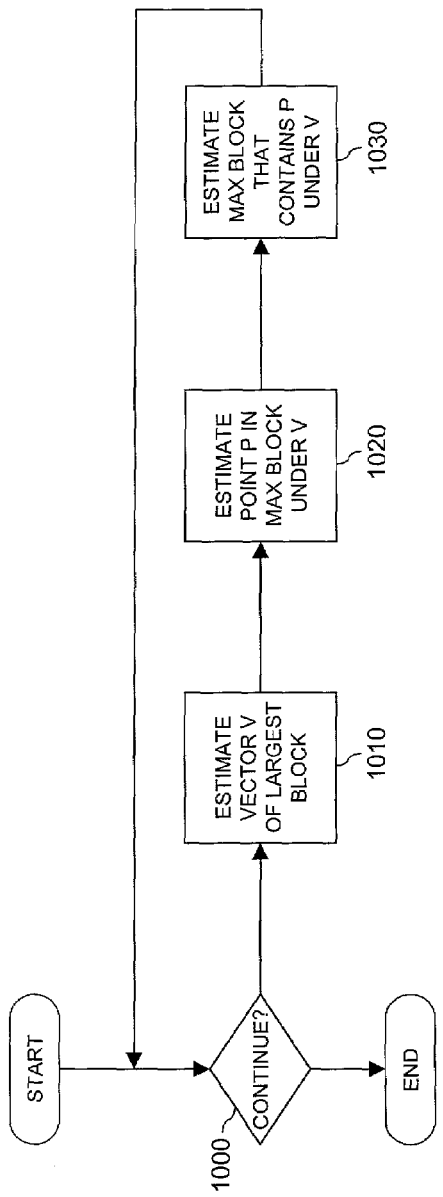
FIG. 10A is a flow diagram illustrating one embodiment of the block determination process according to one aspect of the invention.

FIG. 10A is a flow diagram illustrating, in general, the process of block rendering 630 (FIG. 6) according to one aspect of the invention. A displacement vector (V) corresponding to the largest block (maximum block size) that occurs, or can fit, in the changed region and also occurs verbatim in any one of the images in memory 500 is guessed or estimated 1010. A point (P), contained within the maximum size block that occurs in the changed region and also occurs verbatim in one of the images in memory 500 (offset by the displacement vector (V)), is estimated 1020. The dimensions of the maximum block that actually contains this point (P) are approximated 1030. If necessary, this procedure may be repeated multiple times to obtain multiple blocks occurring verbatim in both the changed region and the image in memory 500. In this manner, a changed or displaced region which occurs in both a current image and a reference (previous) image may be efficiently identified and/or represented by its shape, location, and displacement.

Figure 10B:
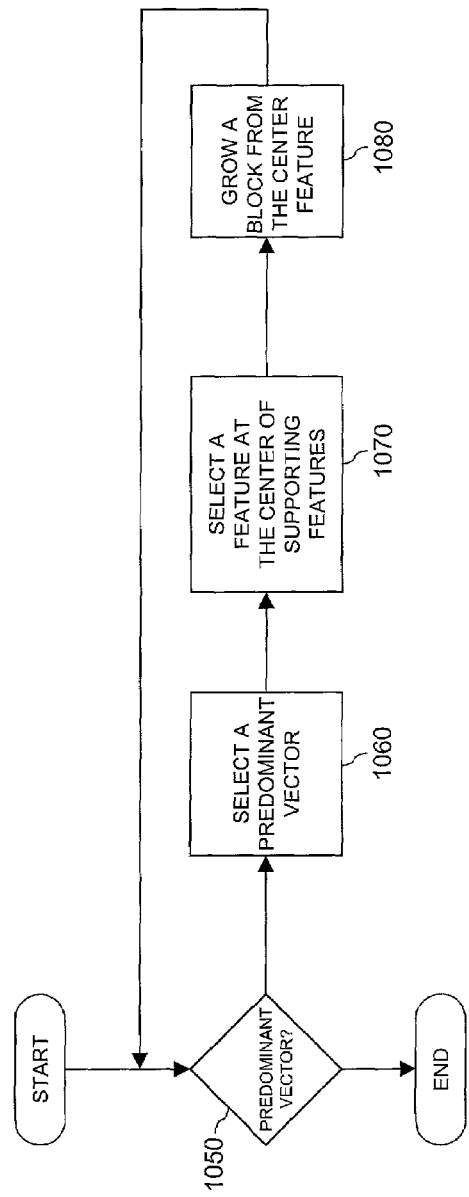
FIG. 10B is a flow diagram illustrating one implementation of the block determination process shown in FIG. 10A according to one aspect of the invention.

The term 'maximum block' as employed herein is not necessarily the largest possible block that can fit within the changed region L17 and also occurs in the selected image in memory 500. Rather, 'maximum block' refers to a block that may be grown, rendered, or generated to an adequate size taking into account time requirements, processing resources, and desired goals of each implementation. One implementation of the process illustrated in FIG. 10A is shown in FIG. 10B. A predominant displacement vector is selected 1060 to represent the displacement of the largest block that occurs verbatim in the changed region and one of the images in memory 500. A predominant displacement vector is one that accounts for some threshold of all remaining vectors. That is, a displacement vector may be selected as a predominant vector if it is representative of a certain percentage of all other displacement vectors calculated. For example, a given displacement vector may be selected as predominant if it represents the same relative displacement as fifty percent or more of the displacement vectors calculated. One or more of the previously calculated displacement vectors (for matching features L43 in FIG. 6) may be employed in selecting a dominant displacement vector.

Next, a point that is contained in the maximum block that occurs in the changed region and, offset by the predominant displacement vector, also occurs verbatim in one of the images in memory 500 is selected 1070. In one implementation, the selected point corresponds to a feature located substantially in the center of all matched features in the changed region supporting the predominant displacement vector. The selected feature acts as a seed point from which to grow a maximum block.

Lastly, the dimensions of the maximum block that contains the selected point are approximated or determined. In one implementation, the selected point that must be contained in the maximum block is used as a seed point and the block's dimensions are estimated or determined by growing a block of pixels starting from the seed point 1080. In one implementation, a single maximum block is grown and associated with a location and a displacement vector to efficiently identify and/or represent a changed region. In other embodiments, multiple blocks may be grown, based on one or more selected seed points and associated with one or more predominant vectors, to efficiently identify and represent a changed region.

Note that in some implementations of the invention, one or more, but not all, of the encoding parameters (i.e., displacement vector, region shape, size, dimensions, and/or seed point) may be known prior to implementing the invention. The portions or aspects of the invention may still be implemented to provide the missing parameters and efficiently encode the changed region. For instance, if the displacement vector or the displacement magnitude were known beforehand, then the shape and location of a common region may be determined as described above. Thus, in some embodiments of the invention, some of the steps or components of the invention may be omitted without deviating from the invention.

The terms 'grow' and 'grown' are employed interchangeably to refer to how a block region is created or rendered by expanding in one or more directions from a given seed point. Typically, a region is grown by expanding along a two-dimensional plane starting from a given seed point. However, the region may be grown more in some directions than in others in a given plane. In yet another implementation, the region may be grown in only two directions from the seed point.

Figure 11:
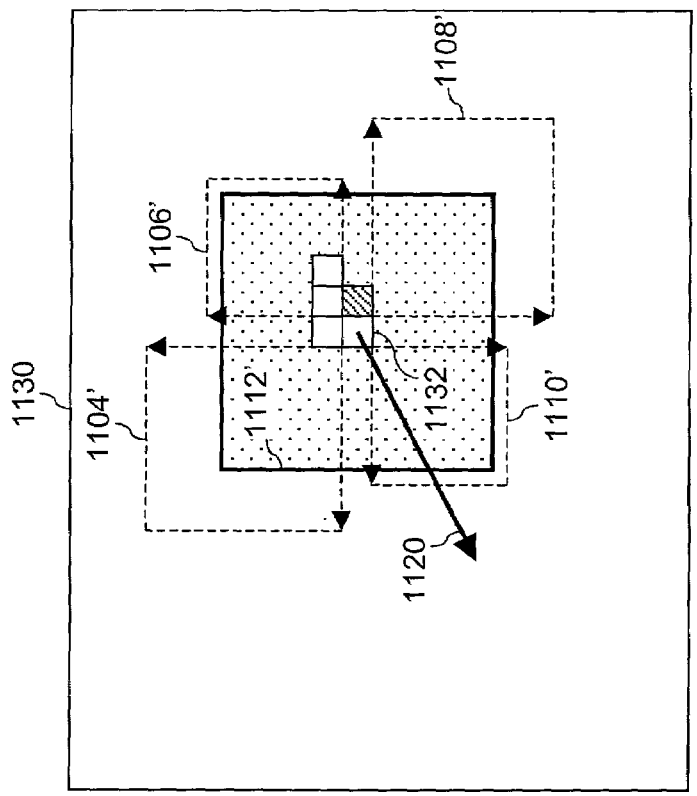
FIG. 11 illustrates how matching blocks are grown from a given seed point and its translation under a given displacement vector according to one embodiment of the invention.
Figure 11:
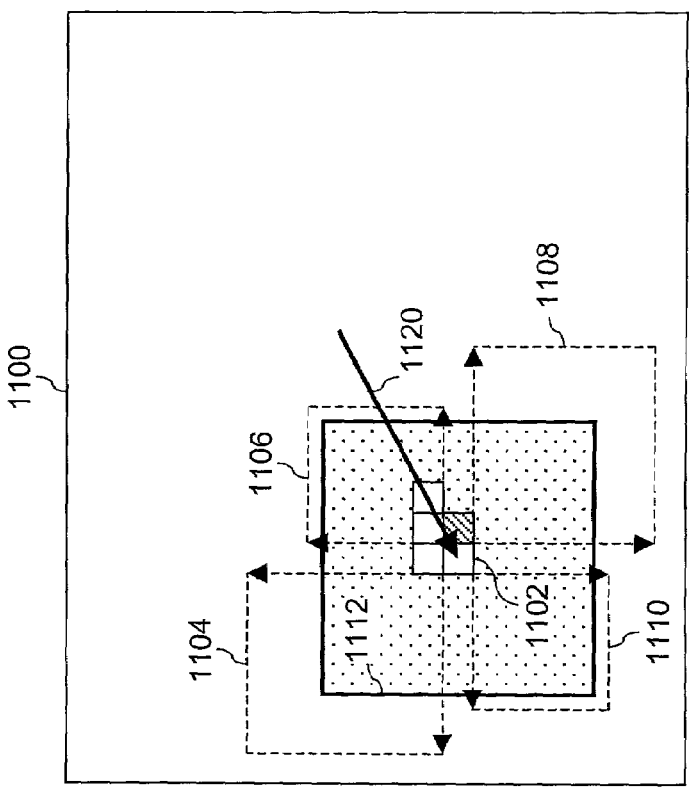

FIG. 11 illustrates how a block 1112 may be grown from a selected seed point 1102 under a displacement vector 1120 according to one embodiment of the invention. The current image 1100 and reference image 1130 are shown with the same block 1112 at different locations. With the pixel 1102 serving as a seed point, a block (portion of a region) is grown in each quadrant 1104, 1106, 1108 and 1110. Then, a single block 1112 is fitted into the region covered by these four blocks 1104, 1106, 1108 and 1110. The single block 1112 in the current frame or image 1110 is also illustrated as 1112' in the reference image 1130 but along with the corresponding blocks for each quadrant 1104', 1106', 1108' and 1110'. In this example, a displacement vector 1120 indicates the change in location of the seed point from pixel location 1132 in the reference image 1130 to pixel location 1102 in the current image 1110. In other embodiments, a different point than the seed point 1102 may be selected to reference the displacement of vector 1120. For example, while the seed point may be located substantially at the center of a block 1112, the reference or anchor point may be located anywhere in the block 1112.

According to one implementation, each block 1104, 1106, 1108 and 1110 is grown, a row and/or column at a time, by comparing the row (or column) in the current image 1100 to the corresponding row (or column) in image 1130 in memory 500 referenced by the displacement vector 1120. If the corresponding rows (or columns) in both images 1100 and 1130 are the same (i.e., contain the same pixel values), then the block 1104, 1106, 1108 or 1110 can continue to be grown. If the rows (or columns) are not the same, then the limit (maximum extent) of the block 1104, 1106, 1108 or 1110 is marked. This block growth is performed in both directions (axis) to obtain the limits for blocks 1104, 1106, 1108 and 1110. In another implementation, all width and height combinations are tried for each of these blocks 1104, 1106, 1108 and 1110. Once the block limits are established for the four blocks 1104, 1106, 1108 and 1110, a single block or region 1112 is formed from the union of these four blocks.

In other implementations, instead of a pixel-by-pixel and/or row-by-row or column-by-column match, the block (i.e., 1104, 1106, 1108 and 1110 is grown in a probabilistic manner by matching a certain percentage of the pixels, between the current image and reference image, as the block is grown. For example, rows may be skipped as the block is grown until some matching criteria is no longer met. The pixels to be matched may be arbitrarily selected as the block is grown.

Various ways of defining the single block or region (e.g. 1112) may be employed without departing from the invention. For instance, a quadrant block (e.g., 1104, 1106, 1108 and 1110) may be grown by one unit (e.g., N pixels) until an instance of a feature that is associated with a displacement vector of different relative displacement than the predominant displacement vector is contained in the block, at which point the block is shrunk by one unit. This scheme is probabilistic in the sense that an exact match is likely, but not guaranteed.

In other implementations, the size of the quadrant blocks may be adjusted to maximize the size of the single block (e.g. 1112). That is, in many instances, it is possible to reduce the dimension (e.g., width) of a quadrant block in one direction in order to allow it to grow (expand) in the other direction. Thus, the overall size of the single block (e.g. 1112) may be maximized by adjusting the dimensions of the multiple blocks (e.g., quadrant blocks 1104, 1106, 1108 and 1110) which confine the single block (e.g., 1112).

In other implementations, a different number of blocks or a region of different shape may be grown initially and a different block growth scheme may be employed without departing from the invention.

In yet other implementations, regions of different shapes, not just a single block or rectilinear region, may be fitted into the initial region for which there is a verbatim or exact copy found in both the current image and one of the images in memory 500. For example, instead of fitting a single block (e.g., 1112) into four quadrant blocks (e.g., 1104, 1106, 1108 and 1110) the four blocks themselves may be used to define a region for which there is a verbatim or exact copy found in both the changed region (or current image) and one of the images in memory 500.

Having defined one or more blocks (e.g., 1112) that occur in both the changed region (or current image) and one of the images in memory 500, for each such block (i.e. 1112) a copy command is generated on L21 that contains sufficient information to recover, reconstruct, regenerate, and/or identify the block's size and its location in either or both the current image and/or reference image in memory 500. For instance, the copy command may include parameters defining a shape or region (i.e., block 1112), a location for the shape or region, and an absolute or relative displacement vector (i.e., vector 1120).

Referring to FIG. 5, memory management unit 560 may modify or delete some of the images in memory 500 or add new images before the next image is examined for block motion 510. For example, assuming memory 500 stores the frame that will appear in frame buffer 210 in FIG. 2 by the time the encoded image on L11 is being processed by the decoder 208, the image produced by the decoder 540 in FIG. 5 may be copied into the frame stored in memory 500, effectively mirroring the contents of frame buffer 210 in memory 500. In response to memory 500 being updated via L27, the block motion detection unit 510 may adjust its internal data structures.

In a preferred embodiment of the present invention, the feature management unit 640 shown in FIG. 5 updates the data structure shown in FIG. 9 as follows. First, it iterates through all lists 815 and removes all instances of features that are no longer present in memory 500 because their underlying pixels have been modified (overwritten). An array 800 that indexes features of an image that has been deleted from or fully overwritten in memory 500 may be destructed or cleared without further inspection. Next, all modified portions/blocks of images in memory 500 and newly added images are scanned for features such that features whose underlying pixels are only partially contained in such a portion/block are also found. For each newly found feature, a list 815 is looked up in an array 800 and the feature is quickly inserted at the beginning of that list 815.

Various aspects of the present invention substantially accelerate the detection of block motion by reducing the search space in three ways and at the same time almost fully retaining the efficiency of an exhaustive search with respect to data compression. First, the current image and all images in memory 500 are sampled at substantially fewer but characteristic locations, according to some definition of a feature, than there are pixels. Second, the likelihood that an instance of a feature in the current image and a randomly selected instance in one of the images in memory 500 are contained in larger matching blocks is estimated by pre-calculated and incrementally updated occurrence counts, and a displacement vector is only calculated if it is likely to apply to surrounding pixels. Third, blocks that occur verbatim (or probabilistically, statistically, approximately, and/or are otherwise likely to occur) in one of the images in memory 500 are determined based on feature-level estimates of some parameters.

Although embodiments of the present invention have been described in terms of certain preferred embodiments, other embodiments are also within the scope of this invention.

For example, block motion may also be detected in a probabilistic manner. That is, a block is likely but not guaranteed to occur verbatim at the location referenced by its displacement vector. In one implementation, the size and/or shape of a block is solely determined at the feature level, but not verified at the pixel level. Referring to FIGS. 2 and 3, erroneous block motion may subsequently be corrected by, for example, copying the decoded frame in frame buffer 210 instead of the original frame in frame buffer 202 to memory 300 and comparing 310 that frame to the next frame to be coded.

In addition, other implementations do not extract all features 600 from the current image and/or do not cache all features in memory 610 that occur in the images stored in memory 500.

In yet other embodiments, blocks may be determined that do not occur verbatim at the locations referenced by their displacement vectors, and the difference between the actual pixels of such a block and those of an approximately matching block may be coded in addition to the block's dimensions and displacement vector. In one implementation, approximately matching blocks may be grown 1030 until the percentage of matching pixels drops below some threshold. The residue may be coded 530 with a lossy or lossless algorithm. The image encoder 530 may code different regions differently depending on their shape, size, or other characteristics.

While certain exemplary embodiments have been described and shown in the accompanying drawings, it is to be understood that such embodiments are merely illustrative of and not restrictive on the broad invention, and that this invention not be limited to the specific constructions and arrangements shown and described. Additionally, it is possible to implement the invention or some of its features in hardware, programmable devices, firmware, software or a combination thereof. The invention or parts of the invention may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:

1. A method comprising:
   correlating, by an encoder, at least a first instance of a first feature in a first image to an instance of the first feature in a reference image;
   determining, by the encoder a first region, that occurs in both the first image and the reference image, based on in least the correlation of the first instance of the first feature in the first image to the instance of the first feature in the reference image to code changes between the first image and the reference image;
   receiving, by a decoder, information from the encoder; and
   updating, by the decoder, a second image by employing a copy of the reference image to reconstruct the first region.

2. The method of claim 1 wherein a feature is defined such that substantially fewer instances of features occur in an image than there are pixels in the image.

3. The method of claim 1 wherein a feature is defined as a value hashed from a pixel template.

4. The method of claim 1 wherein a feature is defined as a value calculated from a fixed-length horizontal run of pixels.

5. The method of claim 1 wherein a feature is defined based on a template of pixels that occurs in a context of a particular arrangement of pixel values.

6. The method of claim 1 wherein the first feature occurs in a context in which the pixels defining the context have the same first color, and the first feature's first pixel has a different color than the first color.

7. The method of claim 1 further comprising:
   scanning the first image for one or more instances of one or more features.

8. The method of claim 1 wherein the first region that occurs in both the first image and the reference image is possibly displaced between the first image and the reference image.

9. The method of claim 1 wherein determining, by the encoder, the first region that occurs in both the first image and the reference image is either a verbatim, probabilistic, or approximate determination process.

10. The method of claim 1 further comprising:
    correlating, by the encoder, an instance of a second feature in the first image to an instance of the second feature in the reference image, wherein determination of the first region is based on at least the correlation of the first instance of the first feature and the instance of the second feature found in the first image and the reference image.

11. The method of claim 1 further comprising:
correlating, by the encoder, one or more other instances of one or more other features in the first image to instances of the one or more features in one or more reference images, wherein determination of the first region is based on some of the one or more correlated instances of the first feature and the one or more other features found in the first image and the one or more reference images.

12. The method of claim 1 wherein the first instance of the first feature is correlated to an arbitrary instance of the same first feature such that a larger region surrounding the instances in the changed image and reference image are likely to match.

13. The method of claim 12 wherein the larger regions surrounding the first instance in the changed image and the arbitrary instance in the reference image are likely to match if the number of instances of the first feature in the reference image is less than a particular threshold number.

14. The method of claim 1 further comprising:
maintaining, by the encoder, a table that includes the locations of one or more instances of features in the reference image to expedite the identification of features that occur infrequently.

15. The method of claim 14 further comprising:
incrementally updating, by the encoder, the table as the reference image changes to expedite the correlation process.

16. The method of claim 1 wherein correlating features includes
comparing, by the encoder, the number of instances of the first feature that occur in the reference image to a threshold number, and looking up an arbitrary instance of the first feature in a table that maps features in the reference image if the number of instances of the first feature is less than the threshold number.

17. The method of claim 1 wherein correlating features includes
comparing, by the encoder, pixels underlying the first instance of the first feature to pixels underlying an arbitrary instance of the first feature in the reference image if the number of instances of the first feature is less than a threshold number.

18. The method of claim 1 wherein the first region that occurs in both the first image and the reference image is identified by a shape, location, and displacement.

19. The method of claim 1 wherein the first region includes one or more blocks, the one or more blocks defining the shape of the region.

20. The method of claim 1 wherein determining the first region includes, maximizing, by the encoder, the size of the first region by iteratively growing the size of one or more blocks that can be found in both the first image and the reference image.

21. The method of claim 20 wherein iteratively growing, by the encoder, the size of one or more blocks includes incrementally matching pixels in both the first image and reference image.

22. The method of claim 21 wherein the process of matching pixels in both the first image and reference image only some of the pixels for each block are matched.

23. The method of claim 1 further comprising determining, by the encoder, a first displacement vector of the first region based on at least a displacement of the first instance of the first feature in the first image relative to its correlated instance in the reference image.

24. The method of claim 23 wherein the first displacement vector is representative of a threshold percentage of relative displacement vectors for one or more correlated instances of features found in both the first image and the reference image.

25. The method of claim 1 further comprising growing, by the encoder, the shape of the first region from a selected seed point.

26. The method of claim 25 further comprising determining, by the encoder, the seed point from the first displacement of the first region and one or more instances of one or more features that support the first displacement vector.

27. The method of claim 1 further comprising:
selecting, by the encoder, a reference image for each instance of a feature, from among multiple reference images, by determining which reference image has the fewest number, but greater than zero, of instances of that feature.

28. The method of claim 27 further comprising indexing, by the encoder, features in the multiple reference images in one or more tables to expedite the identification of features that occur infrequently.

29. A system comprising:
an encoder configured to
correlate one or more instances of one or more features in a first image to instances of the same features in a reference image,
determine a first region, which occurs in both the first image and the reference image but possibly displaced between the first image and the reference image, based on the correlation of features in the first image to instances of the same features in the reference image; and
a decoder configured to
receive information from the encoder, and
update a second image by employing a copy of the reference image to reconstruct the first region.

30. The system of claim 29 wherein the encoder is further configured to extract instances of features from the current image, and
maintain a feature table of instances of features found in the reference image.

31. The system of claim 29 wherein the encoder correlates instances of features by
comparing the number of instances of a correlated first feature in the reference image to a threshold number, and
looking up an arbitrary instance of the first feature in a feature table for the reference image if the number of instances of the first feature in the reference image is less than the threshold number.

32. The system of claim 29 wherein the encoder verifies correlated instances of features by
comparing pixels underlying a first instance of a first feature in the first image to pixels underlying an arbitrary instance of the first feature in die reference image if the number of instances of the first feature in the reference image is less than a threshold number.

33. The system of claim 29 wherein
the encoder is further configured to identify the possibly displaced first region by a shape, a location, and a displacement to code and output changes between the first image and the reference image, and the decoder is further configured to receive the shape, location, and displacement and use them to reconstruct the first region.

34. A system comprising:

an encoder comprising means for detecting motion of one or more regions found in both a current image and a reference image by correlating instances of one or more features in the current image to instances of the same features in the reference image; and means for identifying a first region that occurs in both the current image and the reference image, but possibly displaced between the current image and the reference image, based on the correlation of instances of one or more features in the current image to instances of the same features in the reference image to code changes between the current image and the reference image; and a decoder comprising means for receiving information from the encoder; and means for updating a second image by employing a copy of the reference image to reconstruct the first region.

35. The system of claim 34 further comprising an encoder further comprises:

means for extracting instances of features from the current image and for providing the instances to the motion detecting means; and means for maintaining a feature table of instances of features found in the reference image and for providing access to the feature table to the motion detecting means.

36. The system of claim 35 further comprising an encoder further comprising:

means for incrementally updating the feature table as the reference image changes.

37. The system of claim 34 wherein the encoder further comprises:

means for defining the first region including means for estimating a predominant displacement vector representative of a threshold percentage of displacement vectors corresponding to the displacement of correlated instances of features in the current image and reference image.

38. The system of claim 34 wherein the encoder further comprises:

means for defining the first region including means for determining a seed point based on one or more features supporting a predominant displacement vector.

39. The system of claim 34 wherein the encoder further comprises:

means for identifying a first region including means for growing one or more blocks from a seed point location, wherein the one or more blocks can be found in both the current image and the reference image, and means for rendering the first region from the union of the one or more blocks.

40. The system of claim 34 further comprising an encoder further comprising:

means for storing a reference image library to store multiple images, wherein for each instance of a feature in the current image a reference image is selected.

41. The system of claim 34 further comprising an encoder further comprising:

means for identifying the first region in terms of a shape, location, and displacement between the current image and the reference image.

* * * * *

UNITED STATES PATENT AND TRADEMARK OFFICE
CERTIFICATE OF CORRECTION

PATENT NO. : 6,983,020 B2 Page 1 of 1
APPLICATION NO. : 10/107981
DATED : January 3, 2006
INVENTOR(S) : Christiansen It is certified that error appears in the above-identified patent and that said Letters Patent is hereby corrected as shown below:

References Cited
U.S. PATENT DOCUMENTS
6,338,086    05/2001    Wahl et al.    606/67

Signed and Sealed this

Fifth day of September, 2006

JON W. DUDAS
*Director of the United States Patent and Trademark Office*